US009444925B2

(12) United States Patent
McKelvey

(10) Patent No.: US 9,444,925 B2
(45) Date of Patent: Sep. 13, 2016

(54) SMARTPHONE PROXIMITY CARD EMULATION

(71) Applicant: Microsoft Corporation, Redmond, WA (US)

(72) Inventor: Alex McKelvey, Seattle, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 94 days.

(21) Appl. No.: 13/918,360

(22) Filed: Jun. 14, 2013

(65) Prior Publication Data

US 2014/0302788 A1 Oct. 9, 2014

Related U.S. Application Data

(60) Provisional application No. 61/809,215, filed on Apr. 5, 2013.

(51) Int. Cl.
| | |
|---|---|
| H04M 1/72 | (2006.01) |
| H04M 1/725 | (2006.01) |
| H04W 4/02 | (2009.01) |
| H04W 12/06 | (2009.01) |
| G06K 19/07 | (2006.01) |
| H02J 7/02 | (2016.01) |

(52) U.S. Cl.
CPC ...... *H04M 1/72527* (2013.01); *G06K 19/0727* (2013.01); *H04W 4/02* (2013.01); *H04W 4/023* (2013.01); *H04W 12/06* (2013.01); *H02J 7/025* (2013.01); *H04M 1/7253* (2013.01); *H04M 2250/04* (2013.01)

(58) Field of Classification Search
CPC combination set(s) only.
See application file for complete search history.

(56) References Cited

U.S. PATENT DOCUMENTS

| | | | | |
|---|---|---|---|---|
| 8,364,077 | B2* | 1/2013 | Koyama et al. | 455/39 |
| 2007/0222609 | A1* | 9/2007 | Duron et al. | 340/572.7 |
| 2008/0055279 | A1* | 3/2008 | Osada | G06F 3/03545 345/179 |
| 2008/0058029 | A1* | 3/2008 | Sato | G06K 19/0702 455/573 |
| 2008/0100451 | A1* | 5/2008 | Wulff | 340/572.7 |
| 2009/0284245 | A1* | 11/2009 | Kirby et al. | 323/318 |
| 2010/0176202 | A1* | 7/2010 | Teraoka | G06K 19/0701 235/492 |
| 2010/0320962 | A1* | 12/2010 | Sekita | H02J 7/025 320/108 |
| 2012/0220224 | A1 | 8/2012 | Walker | |

OTHER PUBLICATIONS

PK, Jayadevan, "How your Smartphone will be the New Swipe Card in Coming Times", Retrieved at <<http://articles.economictimes.indiatimes.com/2012-04-05/news/31294125_1_access-control-smart-card-access-cards>>, Apr. 5, 2012, pp. 4.

(Continued)

*Primary Examiner* — Junpeng Chen
(74) *Attorney, Agent, or Firm* — Miia Sula; Judy Yee; Micky Minhas

(57) ABSTRACT

Methods, systems, and computer program products are provided that enable a portable computing device to emulate a proximity card. A portable computing device is provided that includes an antenna, storage that stores an identification number, and a processor. The processor is configured to control modulation of the identification number onto a carrier signal received by the antenna from a proximity card reader device. In this manner, an applicable function may be enabled, and the portable computing device emulates a proximity card. The antenna may be specific to proximity card emulation, or may be shared with other portable computing device functions, such as wireless charging.

20 Claims, 5 Drawing Sheets

(56) References Cited

OTHER PUBLICATIONS

Shein, Esther, "NFC Smartphones Replace Card Keys in Pilot Program", Retrieved at <<http://www.informationweek.com/byte/personal-tech/smart-phones/nfc-smartphones-replace-card-keys-in-pil/240007950>>, Sep. 26, 2012, pp. 5.

"Nokia Developer-NFC", Retrieved at <<http://www.developer.nokia.com/Develop/NFC/>>, Feb. 25, 2013, pp. 2.

"What's New in Windows Phone SDK 8.0", Retrieved at <<http://msdn.microsoft.com/en-us/library/windowsphone/develop/jj206940(v=vs.105).aspx>>, Mar. 6, 2013, pp. 20.

Zalud, Bill, "Another Evolution", Retrieved at <<http://www.securitymagazine.com/articles/83038-another-evolution->>, May 1, 2012, pp. 15.

"Google Wallet—Android Apps on Google Play", Retrieved at <<https://play.google.com/store/apps/details?id=com.google.android.apps.walletnfcrel&hl=en, Retrieved Date: Apr. 3, 2013, pp. 2.

Clark, Sarah, "Deutsche Telekom Unveils Mobile Payments Plans", Retrieved at <<http://www.nfcworld.com/2012/07/03/316646/deutsche-telekom-unveils-mobile-payments-plans/>>, Jul. 3, 2012, pp. 4.

"NFC Basics—Android Developers", Retrieved at <<http://developer.android.com/guide/topics/connectivity/nfc/nfc.html>>, Jun. 23, 2012, pp. 16.

"Using Smartphones as Credit Cards", Retrieved at <<http://www.chainway.net/news/Smartphones.asp>>, Retrieved Date: Apr. 3, 2013, pp. 2.

Szczys, Mike, "Store your RFID Transit Card Inside your Cellphone", Retrieved at <<http://hackaday.com/2012/07/17/store-your-rfid-transit-card-inside-your-cellphone/>>, Jul. 17, 2012, pp. 12.

"Intelligent Car Key in a Cell Phone", Retrieved at <<http://www.telekom.com/innovation/connectedcar/81840>>, Jul. 20, 2012, p. 1.

"Is Access Control Ready for the NFC Smartphone Future", Retrieved at <<http://www.git-security.com/topstories/security/access-control-ready-nfc-smartphone-future>>, Apr. 23, 2012, pp. 3.

* cited by examiner

SMARTPHONE PROXIMITY CARD EMULATION

CROSS REFERENCE TO RELATED APPLICATIONS

This application claims the benefit of U.S. Provisional Application No. 61/809,215, filed on Apr. 5, 2013, which is incorporated by reference herein in its entirety.

This application is also related to the following U.S. patent application, which also claims the benefit of U.S. Provisional Patent Application No. 61/809,215, and which is also incorporated by reference herein:

U.S. patent application Ser. No. 13/918,387, titled "Techniques For Selecting A Proximity Card Of A Mobile Device For Access," filed on Jun. 14, 2013.

BACKGROUND

A proximity card is a smart card that can be "read" without inserting it into a reader device, as required by earlier magnetic stripe cards such as credit cards. When used, a proximity card is transported near an electronic reader. The reader wirelessly communicates with the card to read information from the card, including an identification number. If it is confirmed that the read identification number is correct (matches the expected identification number), the applicable function may be performed.

Passive and active proximity cards exist. Passive proximity cards, which are currently more widely used, are powered by radio frequency signals from the reader device. As such, passive cards have a more limited range and must be positioned relatively closer to the reader device to be read. Active proximity cards have an internal battery that provides power to the card. As such, active proximity cards may have a greater range than passive proximity cards.

Proximity cards may be used for various purposes, such as keyless door access, contactless payment, and other purposes. As such, a proximity card enables a function to be easily and conveniently performed for a user through automatic wireless communications. However, a user must make sure to carry a proximity card on their person, which can be cumbersome. If a person forgets to carry a proximity card (in addition to the other items that they may have to carry), they will be unable to access the applicable function.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Methods, systems, and computer program products are provided that enable a mobile computing device to emulate a proximity card. A portable computing device may store one or more identification numbers. The portable computing device may respond to a proximity card reader interrogation by providing an identification number, and an applicable function may be enabled, thereby emulating a proximity card. In some implementations, the portable computing device may include an antenna specifically configured to communicate with proximity card readers. In other implementations, the portable computing device may include an antenna used to communicate with proximity card readers, as well as being used to communicate with other entities external to the portable computing device. In one implementation, an antenna of the portable computing device may be used to enable communications with proximity card readers, as well as being configured to enable communications with one or more other external devices, such as another portable device or a wireless battery charger.

In one implementation, a portable computing device is provided that includes an antenna, storage that stores an identification number, and a processor. The processor is configured to control modulation of the identification number onto a carrier signal received by the antenna from a proximity card reader device to enable the portable computing device to emulate a proximity card.

In one aspect, the portable computing device may be a smartphone, or may be another type of portable computing device.

The portable computing device may be configured to emulate a proximity card by responding to a proximity card reader device in a first mode, and to receive a wireless charging signal from a battery charger to charge a rechargeable battery in a second mode.

In an aspect, the portable computing device may include a carrier detection module configured to determine whether the carrier signal is transmitted by a wireless charger or by the proximity card reader device. The carrier detection module provides an indication of the carrier signal to the processor when the wireless signal is determined to be transmitted by the proximity card reader device.

In a further aspect, the portable computing device may include a modulation circuit coupled between the processor and the antenna. The processor may be configured to retrieve the identification number from the storage and to provide the identification number to the modulation circuit according to a predetermined timing. The modulation circuit may be configured to modulate the identification number onto the carrier signal at the antenna according to the predetermined timing. The predetermined timing may be configured to synchronize bits of the identification number with a frequency of the carrier signal, or may be configured according to other timing.

In one aspect, the processor may be configured to enable the identification number to be modulated onto the carrier signal for a predetermined time duration (e.g., a couple of seconds or other time duration), and may enable wireless charging of the rechargeable battery after expiration of the predetermined time duration.

In another implementation, a method in a portable computing device is provided. A carrier signal transmitted by a proximity card reader device is received at an antenna of the portable computing device. An identification number stored in storage of the portable computing device is accessed. The identification number is modulated onto the carrier signal to enable the portable computing device to emulate a proximity card.

Furthermore, wireless charging capability associated with the antenna may be disabled prior to the modulating of the identification number onto the carrier signal. The identification number may be sent via the carrier signal one or more times, including being sent a predetermined number of times (e.g., modulating the identification number onto the carrier signal four times, etc.). After sending the identification number one or more times, the wireless charging capability associated with the antenna may be enabled.

Still further, the modulating of the identification number onto the carrier signal may be performed for a predetermined time duration. The wireless charging capability may be enabled after expiration of the predetermined time duration.

A computer readable storage medium is also disclosed herein having computer program instructions stored therein that enable a portable computing device to emulate a proximity card according to the embodiments described herein.

Further features and advantages of the invention, as well as the structure and operation of various embodiments of the invention, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form a part of the specification, illustrate the present invention and, together with the description, further serve to explain the principles of the invention and to enable a person skilled in the pertinent art to make and use the invention.

Figure 1:
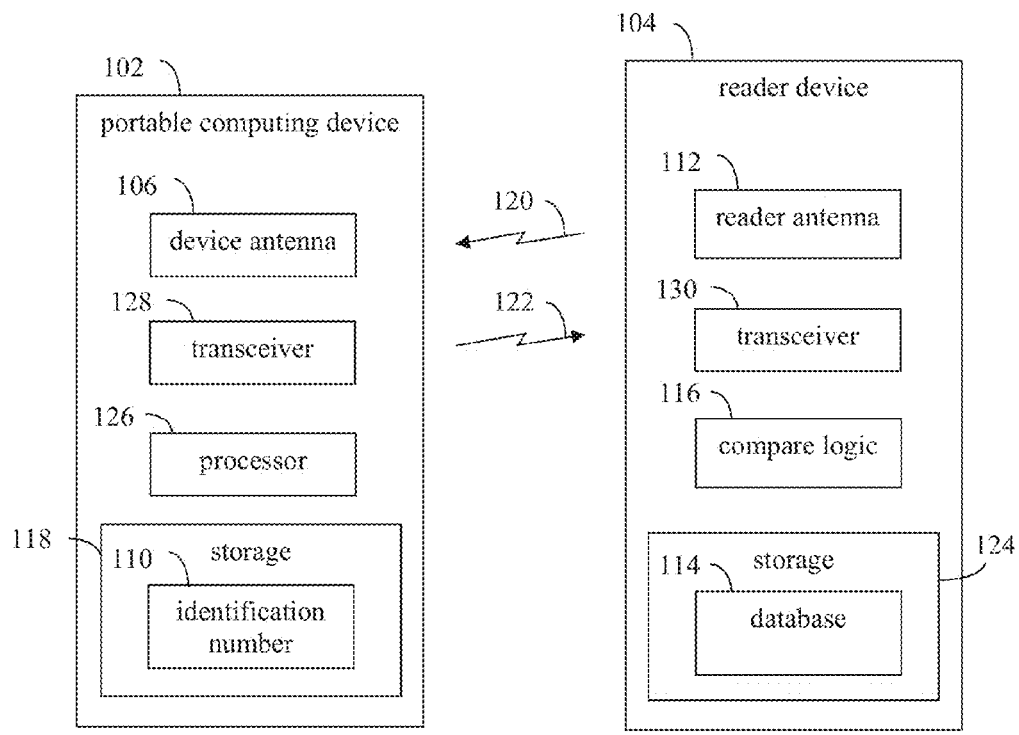
FIG. 1 shows a block diagram of a communication system in which a portable computing device emulates a proximity card in communications with a reader device, according to an example embodiment.

The features and advantages of the present invention will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

I. Introduction

The present specification discloses one or more embodiments that incorporate the features of the invention. The disclosed embodiment(s) merely exemplify the invention. The scope of the invention is not limited to the disclosed embodiment(s). The invention is defined by the claims appended hereto.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Numerous exemplary embodiments of the present invention are described as follows. It is noted that any section/subsection headings provided herein are not intended to be limiting. Embodiments are described throughout this document, and any type of embodiment may be included under any section/subsection. Furthermore, embodiments disclosed in any section/subsection may be combined with any other embodiments described in the same section/subsection and/or a different section/subsection in any manner.

II. Example Embodiments

A proximity card is a smart card that can be "read" without inserting it into a reader device, as required by earlier magnetic stripe cards such as credit cards. When used, a proximity card is transported (e.g., carried or held) near an electronic reader. For instance, the proximity card may be held against a reader pad. The reader wirelessly communicates with the card to read an identification number from the card. If it is confirmed that the read identification number is correct (matches an expected identification number), the applicable function may be performed.

NFC (near field communication) is a set of standards and techniques for radio communications between devices at very short ranges, such as when the devices are positioned in close proximity to each other, including being contacted together. Most proximity card based door access systems, as well as other systems that communicate with proximity cards, do not use NFC and are incompatible with current smart phones.

According to embodiments disclosed herein, a mobile or portable computing device such as a smart phone or a wearable computing device is enabled to operate as a proximity card. The portable computing device may replace one or more physical proximity cards for a user, and therefore the user need not carry proximity cards in addition to a smart phone or other portable electronic device that the user may typically carry anyway. Such a proximity card-enabled portable computing device may be used for keyless door access, contactless payment, and other purposes fulfilled by proximity cards. Furthermore, such proximity card-enabled portable computing devices may be more easily provisioned than physical proximity cards (e.g., over the air (OTA) provisioning), and may provide improved security against cloning and theft relative to physical proximity cards (e.g., PIN unlock may be required before the card identification number is transmitted). As such, embodiments described herein provide convenience for users.

Example embodiments are described in the following subsections for a portable computing device enabled to operate as a proximity card. The next subsection describes example embodiments for proximity card emulation, and the subsequent subsection describes example embodiments for leveraging antennas that are present in some portable computing devices, such as wireless power transfer antennas, for proximity card emulation.

Example Proximity Card Emulation Embodiments

Embodiments may be implemented in a variety of environments and devices. For instance, FIG. 1 shows a block diagram of a communication system 100 in which a portable computing device 102 emulates a proximity card in communications with a reader device 104, according to an example embodiment. As shown in FIG. 1, computing device 102 includes a device antenna 106, storage 118, a processor 126, and a transceiver 128. Storage 118 stores an identification number 110. Reader device 104 includes a reader antenna 112, compare logic 116, storage 124, and a transceiver 130. Storage 124 stores a database 114. Storage 124 and database 114 may be local to reader device 104, or may be accessed remotely from reader device 104 (e.g., at a remote portion of an access control system in which reader device 104 is included). These features of communication system 100 are described as follows.

Computing device 102 may be any type of portable computing device, including a mobile computer or computing device (e.g., a Microsoft® Surface® device, a personal digital assistant (PDA), a laptop computer, a notebook computer, a tablet computer such as an Apple iPad™, a netbook, etc.), a mobile phone (e.g., a cell phone, a smart phone such as a Microsoft Windows® phone, an Apple iPhone, a Google Android™ phone, a Palm® device, a RIM Blackberry® device, etc.), a wearable computing device (such as a watch or glass) or other type of mobile computing device. Reader device 104 is a proximity card reader that may be implemented in one or more computer systems, and may be mobile (e.g., handheld) or stationary. In an embodiment, reader device 104 may include a surface or other designated area that a proximity card can contacted with by a user, although such a surface/area is not present or needed in all implementations.

Storage 118 and 124 may each include one or more of any type of storage mechanism to store data, including a magnetic disc (e.g., in a hard disk drive), an optical disc (e.g., in an optical disk drive), a magnetic tape (e.g., in a tape drive), a memory device such as a RAM device, a ROM device, etc., and/or any other suitable type of storage medium.

Portable computing device 102 may be used by one or more associated persons ("users") for any number and type of functions. For example, in a smart phone implementation of computing device 102, a user may use computing device 102 to make phone calls (e.g., cellular calls, etc.), and the smart phone implementation of computing device 102 may have processing capability that enables one or more mobile applications to execute on computing device 102 ("mobile apps"). For instance, the user may interact with a browser of computing device 102 to browse the Internet, may use computing device 102 to check email, etc.

Furthermore, according to an embodiment, computing device 102 may be configured to emulate a proximity card for the user. As shown in FIG. 1, reader device 104 and portable computing device 102 may communicate with each other using wirelessly transmitted signals to enable a function to be performed, as enabled by the proximity card functionality of computing device 102.

For example, portable computing device 102 may be positioned proximate to reader antenna 112 of reader device 104. The user may hold portable computing device 102 near reader antenna 112, or portable computing device 102 may be in a pocket, purse, or otherwise be carried by the user to be positioned proximate to reader antenna 112. Reader device 104 wirelessly communicates with portable computing device 102 by reader antenna 112 transmitting an interrogation signal 120, which is received by an antenna of portable computing device 102, such as device antenna 106. Portable computing device 102 responds to signal 120 by transmitting identification number 110 from storage 118 to reader device 104 in a response signal 122. Response signal 122 is received by reader antenna 112.

Figure 2:
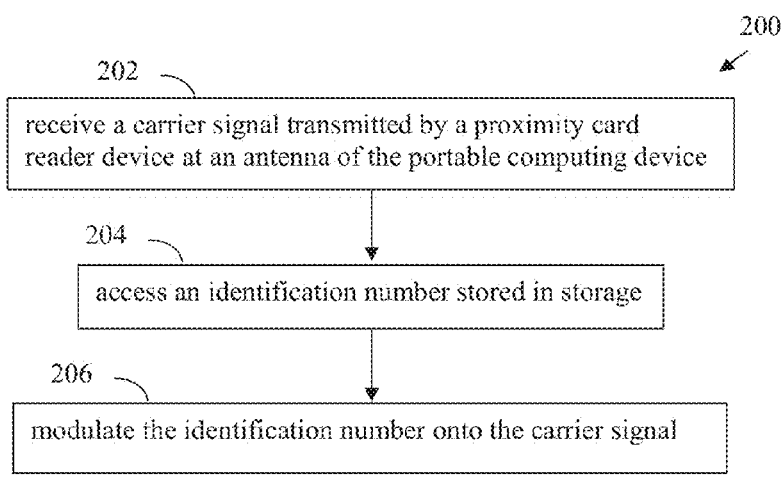
FIG. 2 shows a flowchart providing a process for enabling a portable computing device to emulate a proximity card, according to an example embodiment.

For instance, in an embodiment, portable computing device 102 may operate according to FIG. 2. FIG. 2 shows a flowchart 200 providing a process for enabling a portable computing device to emulate a proximity card, according to an example embodiment. Flowchart 200 and portable computing device 102 are described as follows. Further structural and operational embodiments will be apparent to persons skilled in the relevant art(s) based on the following description.

Flowchart 200 begins with step 202. In step 202, a carrier signal transmitted by a proximity card reader device is received at an antenna of the portable computing device. For example, as shown in FIG. 1, transceiver 130 of reader device 104 may transmit interrogation signal 120 from reader antenna 112. Interrogation signal 120 may be a carrier signal (i.e., a carrier field). In example embodiments, interrogation signal 120 may include a 125 kHz carrier signal or other carrier signal used for proximity card access. As shown in FIG. 1, transceiver 128 of portable computing device 102 receives interrogation signal 120 via device antenna 106. Transceiver 128 may provide an indication to processor 126 that the carrier signal of interrogation signal 120 is received. Processor 126 may be a physical processor (e.g., a processor chip, a microcontroller chip, a microprocessor, a central processing unit (CPU), etc.) or may be a collection of logic components configured to perform processing.

In step 204, an identification number stored in storage is accessed. For example, as shown in FIG. 1, in response to receiving carrier signal 120, processor 126 may access identification number 110 in storage 118. Identification number 110 (or "ID number" 110) may be a number of any length (e.g., any number of digits having values from 0 to 9, digits having values of 0 or 1, etc.), and may be formatted in any manner, including having any form of encoding, and/or being stored in an encrypted or non-encrypted form. When encrypted, processor 126 may be configured to decrypt identification number 110 according to the applicable decryption process.

In step 206, the identification number is modulated onto the carrier signal. For example, as shown in FIG. 1, transceiver 128 may be configured to modulate identification number 110 onto the received carrier signal, to transmit response signal 122 from antenna 106. For example, in one embodiment, antennas 106 and 112 may be loop antennas (coils) that communicate according to a proximity card communication technique (e.g., resonant energy transfer, etc.). For instance, when device antenna 106 is placed within communication range of reader antenna 112, the coil (and any load thereon, such as by a capacitor, etc.) form a tuned circuit, and can absorb and store energy from the carrier field. To communicate the identification number to reader device 104, transceiver 128 may be configured to vary a load (e.g., an impedance characteristic of antenna 106) provided to the carrier signal/field by antenna 106 (e.g., by opening and closing a loop of antenna 106 with a switch, or by other technique) in a sequence defined by identification number 110. This modulates identification number 110 onto the received carrier signal as response signal 122. Transceiver 130 receives response signal 122 via antenna 112, and can detect the changes in the carrier signal/field (e.g., variations in current draw) caused by the variations in the field load provided by antenna 106. Reader device 104 may use these detected changes to recover identification number 110 from response signal 122.

For instance, in one embodiment, when a value of change in the electromagnetic field is minimum or least affected by antenna 106 (e.g., a loop of antenna 106 is open, or otherwise least modified or unmodified with a load), transceiver 130 may detect this change (or no change) in field value, which may be interpreted as a logic "0" (or "1"). When a value of change in the electromagnetic field is maximum or most affected by antenna 106 (e.g., a loop of antenna 106 is closed, or otherwise modified with a load), transceiver 130 may detect this field value, which may be interpreted as a logic "1" (or "0"). A string of detected logic "1"s and "0"s can be equated to identification number 110.

At reader device 104, functionality may be enabled if received identification number 110 from portable computing device 102 matches an expected value. For instance, compare logic 116 may receive identification number 110 from transceiver 130. Compare logic 116 may compare identification number 110 to one or more expected identification numbers in database 114, which is stored in storage 124. If compare logic 116 determines that the received identification number matches an expected identification number in database 114, the applicable function may be enabled to be performed by reader device 104 or by another mechanism (e.g., a monetary transaction may be enabled, access to a facility may be granted by unlock and/or opening a door, etc.). As such, portable computing device 102 enables a function to be easily and conveniently performed for a user through automatic wireless communications. Furthermore, by using portable computing device 102, the user does not need to carry a separate proximity card on their person, in addition to portable computing device 102.

Example Embodiments Using Wireless Power Antennas for Proximity Card Emulation

Some portable electronic devices are configured to be charged wirelessly. In such devices, a rechargeable battery of the device may be charged by wireless electrical signals received from a battery charger rather than the device having to be physically connected to a charger by a connector and/or cable. Such charging techniques may be referred to as "wireless charging," "inductive charging," or "wireless power transfer" (WPT). Wireless charging typically operates at frequencies at which proximity card readers operate ("proximity card frequencies" or "proximity card carrier frequencies"), and thus may use a wireless charging to receive wireless charging signals. Proximity card carrier frequencies include 125 kHz and 134 kHz, and thus, in one embodiment, a "proximity card carrier frequency range" may be considered to be the frequency range of 125 kHz to 134 kHz. A proximity card carrier frequency range, which is a kilohertz carrier frequency range, is distinguished from and non-overlapping with a near field communication (NFC) communication carrier frequency range, which is a megahertz frequency range (e.g., including 13.56 MHz). The lower proximity card frequencies have a relatively low data transfer rate compared to NFC data communications occurring with the higher NFC communication frequency range (e.g., data rate of 106 kbit/sec to 424 kbit/sec).

As such, wireless charging can be performed in the proximity card carrier frequency range and in an embodiment, an antenna that is present in a portable computing device for wireless charging may also be used to emulate proximity card data with a proximity card reader. In contrast, an NFC antenna (operating in the megahertz carrier frequency range) does not support the kilohertz proximity card carrier frequency range, and thus may not be used for proximity card emulation (or for wireless charging).

Figure 3:
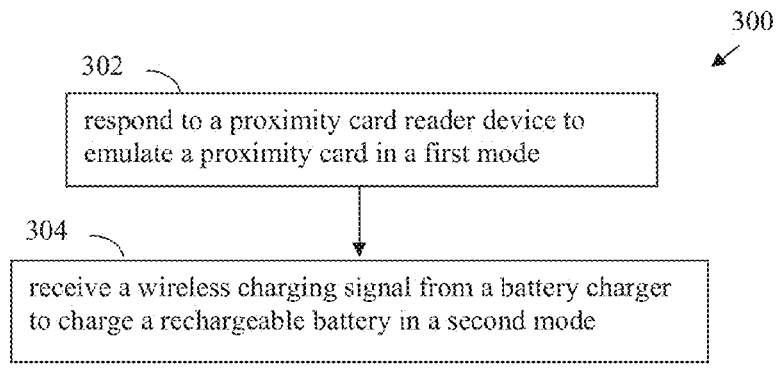
FIG. 3 shows a flowchart providing a process for enabling a portable computing device to emulate a proximity card and perform wireless charging using a common antenna, according to an example embodiment.

In such a case, a portable computing device may be configured to operate in different modes, including a wireless charging mode and a proximity card emulation mode. For instance, FIG. 3 shows a flowchart 300 providing a process for enabling a portable computing device to emulate a proximity card and perform wireless charging using a common antenna, according to an example embodiment. In an embodiment, portable computing device 102 may operate according to flowchart 300. In such an embodiment, device antenna 106 of portable computing device 102 may operate as a proximity card antenna in a first mode, and as a wireless power transfer antenna in a second mode. Flowchart 300 is described as follows.

According to step 302 of flowchart 300, a proximity card reader device is responded to, to emulate a proximity card in a first mode. For instance, as described above with reference to FIG. 1, portable computing device 102 may use device antenna 106 to receive a proximity card reader signal, and to transmit identification number 110 in response. In such a mode, portable computing device 102 emulates a proximity card.

In step 304, a wireless charging signal is received from a battery charger to charge a rechargeable battery in a second mode. For instance, in another mode, portable computing device 102 may use device antenna 106 to receive a wireless power signal. Portable computing device 102 may charge a rechargeable battery with a current derived from the wireless power signal electromagnetic field.

Figure 4:
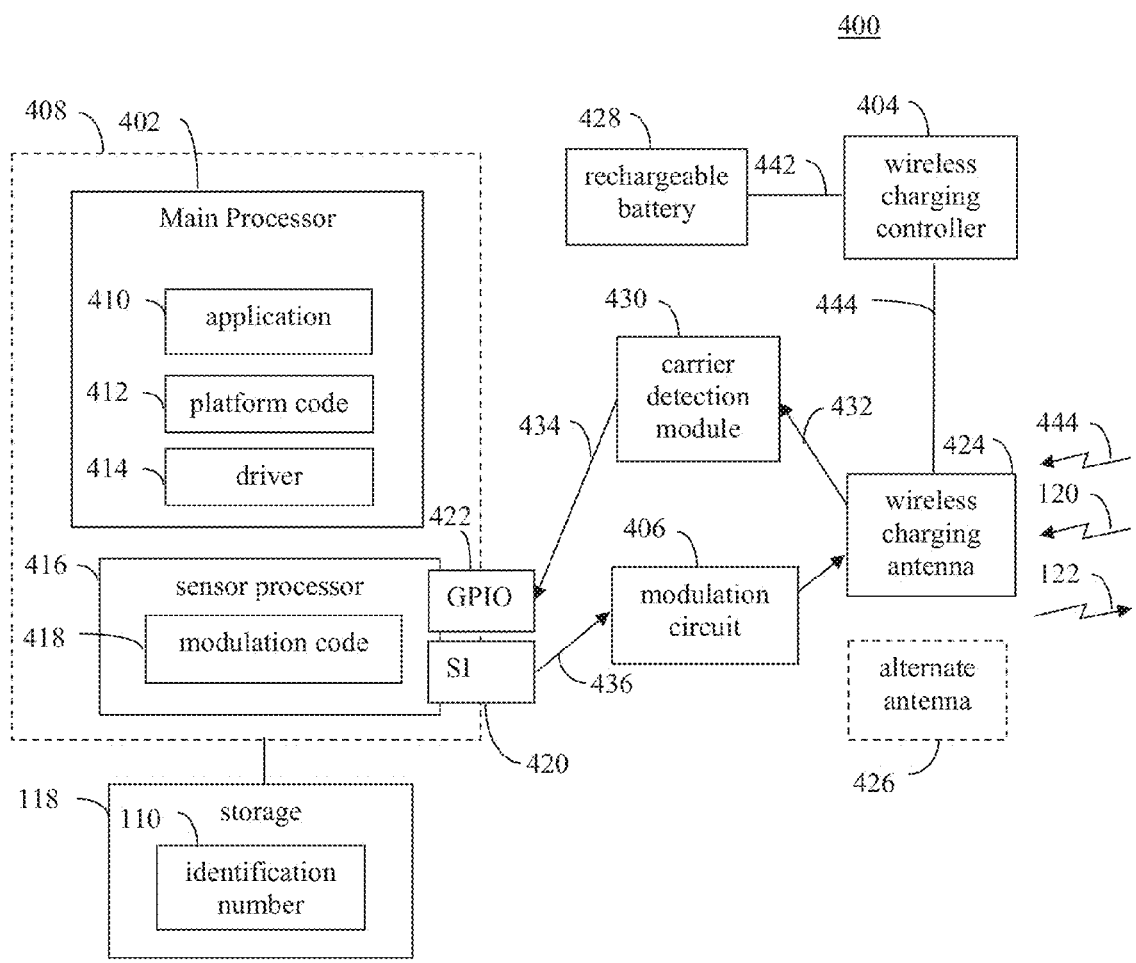
FIG. 4 shows a block diagram of a portable computing device that is configured to emulate a proximity card and enable wireless charging using a same antenna, according to an example embodiment.

Portable computing device 102 may be configured in various ways to be enabled to use a same antenna for proximity card emulation and wireless charging. For instance, FIG. 4 shows a block diagram of a portable computing device 400, according to an example embodiment. Portable computing device 400 is an example of portable computing device 102 of FIG. 1, and is configured to use a same antenna for proximity card emulation and wireless charging. As shown in FIG. 4, portable computing device 400 includes a wireless charging antenna 424 that may be used by portable computing device 400 to communicate with a reader (e.g., reader device 104 of FIG. 1) to emulate a proximity card. As shown in FIG. 4, portable computing device 400 includes storage 118, a main processor 402, a wireless charging controller 404, a modulation circuit 406, a dedicated sensor processor 416, a wireless charging antenna 424, an optional alternate antenna 426, a rechargeable battery 428, and a carrier detection module 430. Main processor 402 includes at least one application 410, platform code 412, and a driver 414, and dedicated sensor processor 416 includes a modulation code 418.

Main processor 402 is a core, central processor of portable computing device 400. Dedicated sensor processor 416 is a processor that may optionally be present that is configured for managing sensors associated with portable computing device 400. In other embodiments, dedicated sensor processor 416 may not be present. In such an embodiment, main processor 402 may perform the functions of dedicated sensor processor 416 described herein, and/or one or more other auxiliary processors may be present that perform those functions. As shown in FIG. 4, main processor 402 and dedicated sensor processor 416 may be included in a same integrated circuit chip 408, or main processor 402 and dedicated sensor processor 416 may be included in separate integrated circuit chips. Furthermore, chip 408 (or the chip corresponding to dedicated sensor processor 402) may include one or both of a SPI port or pin 420 or a GPIO port or pin 422.

Application 410 may be one of one or more applications hosted by portable computing device 400, which may include one or more first and/or third party applications. Platform code 412 and driver 414 may be present to enable functionality described herein for modulation code 418 when sensor processor 416 is not present.

Wireless charging controller 404 is configured to control charging of rechargeable battery 428. Rechargeable battery 428 is a battery that provides power to electronics of portable computing device 400. Wireless charging controller 404 charges battery 428 by a wireless charging current 442 (e.g., a charge current in milliamps). Wireless charging controller 404 generates wireless charging current 442 based on a wireless charging signal 444 received at wireless charging antenna 424 from a wireless charger (not shown in FIG. 4). Wireless charging signal 444 may be generated by a wireless charger, received by antenna 424, and used by wireless charging controller 404 to charge rechargeable battery 428 in any manner, including according to the Qi interface standard developed by the Wireless Power Consortium, as would be known to persons skilled in the relevant art(s).

In embodiments, wireless charging controller 404 may be included in chip 408, or may be included in a separate chip. As described below, wireless charging antenna 424 may be used to communicate using proximity card communication signals to enable portable computing device 400 to emulate one or more proximity cards. It is noted that in another embodiment, an alternate antenna (e.g., alternate antenna 426) may be used to communicate according to proximity card communication signals to enable portable computing device 400 to emulate one or more proximity cards. In such as case, alternate antenna 426 may be an antenna dedicated to the proximity card communications, or may be an antenna of portable computing device 400 that is additionally used to communicate according to other wireless communication standards and protocols.

Accordingly, portable computing device 400 of FIG. 4 may operate according to flowchart 200 of FIG. 2, such that in step 202, a carrier signal may be received from a reader. As shown in FIG. 4, interrogation signal 120 may be received at wireless charging antenna 424 from a reader device, such as reader device 104 of FIG. 1. Wireless charging antenna 424 may output a carrier signal 432 on a conductor (e.g., a metal trace) or conductor pair that contains the carrier frequency of interrogation signal 120. Carrier signal 432 may be received by carrier detection module 430. Carrier detection module 430 is configured to detect whether a carrier frequency is received in carrier signal 432 that matches a carrier frequency transmitted by a reader device, such as 125 kHz or 134 kHz. Carrier detection module 430 may be configured to detect a received carrier frequency in any manner, as would be known to persons skilled in the relevant art(s). For instance, carrier detection module 430 may compare a frequency received in carrier signal 432 to one or more predetermined, internally generated frequencies (e.g., generated by oscillators, clock circuits, etc.) matching desired carrier frequencies. If carrier detection module 430 detects a carrier frequency of a reader device on carrier signal 432, carrier detection module 430 may generate detected carrier indication 434, which indicates a carrier frequency was detected, and may include the carrier frequency itself conditioned into digital form (e.g., to be used as a clock). Carrier detection module 430 may generate detected carrier indication 434 to include a digitized form of the carrier frequency in any manner (e.g., using an analog-to-digital (A/D) converter, a Zener diode, or other technique).

As shown in FIG. 4, dedicated sensor processor 416 may receive detected carrier indication 434 on a GPIO (general purpose input-output) port 422. If asleep or otherwise occupied, sensor processor 416 may be awakened or interrupted by carrier indication 434. GPIO port 422 is a general purpose input-output port (e.g., a pin) of sensor processor 416, which can be configured to transmit and receive various types of signals. In other embodiments, another type of processor port may be used. When detected carrier indication 434 is received, sensor processor 416 may perform step 204 of flowchart 200 (FIG. 2). In such case, sensor processor 416 may be configured to retrieve identification number 110 from storage 118. Sensor processor 416 may be configured to provide identification number 110 to modulation circuit 406 for transmission in response to interrogation signal 120 according to step 206 of flowchart 200.

For example, in an embodiment, modulation code 418 of sensor processor 416 may be configured to retrieve identification number 110 from storage 118, and to output identification number 110 at a serial port 420 of sensor processor 416 as timed ID signal 436. Serial port 420 is a serial port of sensor processor 416 that may be used to output data serially, according to desired timing, in a more accurate manner than a GPIO port. While software-based card emulation implementations may implement "bit banging" to output a modulation bit stream from a GPIO pin, such a technique typically requires microsecond timing accuracy on the part of the processor and is relatively more processor intensive. As such, in an embodiment, serial port 420 may be used to output timed ID signal 436 as a modulation control signal. The clock used by modulation code 418 to time the output of timed ID signal 436 may be an internally generated clock or may be the clock included in detected carrier indication 434 (which may be derived from the incoming carrier signal). Modulation code 418 controls serial port 420 to output bits of identification number 110 in timed ID signal 436 in sync with the received carrier signal (or with another clock signal) according to a predetermined timing (e.g., with bit lengths and spacing according to the bit transmission requirements of the applicable proximity card communication protocol being used). Timed ID signal 436 may be generated in a manner to eliminate idle time between bit groupings (e.g., bytes) that may be present in conventional serial bit streams, and to continuously output each bit for each clock cycle driven by the carrier signal. Sensor processor 416 or modulation circuit 406 may configure a logic state of the output during idle time, if desired, to minimize any error in the output modulation seen by the reader as a result of the idle time. If an idle time between bit groupings cannot be avoided in an implementation, the idle time may be configured to be as predictable and short as possible, with the bit groups as large as possible. Serial port 420 may be configured to not require any additional signaling (e.g., such as a slave select), or the signaling may be generated locally (e.g., by hardwired pull up/down).

In an embodiment, an asynchronous serial port may be present in portable computing device 400, and may be used for readers that are not sensitive to the modulation signal having to be in sync with the carrier signal frequency. In this case, the received carrier signal may be used to determine whether a reader or wireless charger is in range, but not used as a clock input. The asynchronous serial port may be configured similarly to a synchronous port, except that the clock signal may be configured to match the expected frequency of the card reader (e.g., generally 125 kHz or less commonly 134 kHz). Note that in other embodiments, another type of processor port may be used to output timed ID signal 436, rather than serial port 420.

As shown in FIG. 4, modulation circuit 406 receives timed ID signal 436. Modulation circuit 406 is configured to modulate the carrier field at wireless charging antenna 424 with the bit stream included in timed ID signal 436. In an embodiment, modulation circuit 406 may be configured to modulate the carrier field with the bits as they are received in timed ID signal 436. Modulation circuit 406 may be configured in various ways to perform the modulation, as would be known to persons skilled in the relevant art(s) from the teachings herein. For instance, modulation circuit 406 may include one or more switches (e.g., a transistor, such as a MOSFET (metal oxide semiconductor field effect transistor), etc.). A switch of modulation circuit 406 may be coupled across the first and second ends of a coil of antenna 424, may couple a load to antenna 424, or may be coupled to antenna 424 in another manner. Modulation circuit 406 may open and close the switch (or switches) to change a load that antenna 424 places on the carrier field generated by the reader device, to modulate the identification number onto the carrier field. In this manner, response signal 122 is generated, and the included identification number can be received by the reader device. If the received identification number is valid, the reader device may enable a function for the user of portable computing device 400 (e.g., opening a door, enabling a monetary transaction, etc.).

Accordingly, portable computing device 400 is enabled to emulate a proximity card, as well as perform wireless charging of an internal battery, using a same antenna. Note that when a carrier signal is received, it may not be known to portable computing device 400 whether the carrier signal was transmitted by a proximity card reader or by a wireless charger. As such, portable computing device 400 may be configured in various ways to respond when the originator of a received carrier signal is not known. For example, in some embodiments, portable computing device 400 may automatically initially assume that a received carrier signal is transmitted by a reader. As such, portable computing device 400 may automatically enter a proximity card emulation mode, and begin transmitting its identification number in response. After transmitting the identification number, portable computing device 400 may enter a wireless charging mode in an attempt to use the carrier signal as a wireless charging signal for a battery.

Alternatively, in some other embodiments, portable computing device 400 may initially analyze the carrier signal in an attempt to determine whether the carrier signal was transmitted by a proximity card reader or by a wireless charger, and may act in accordance with the determination (e.g., transmit the identification number if determined to be transmitted by a reader, or begin wireless battery charging if determined to be transmitted by a wireless charger.

Figure 5:
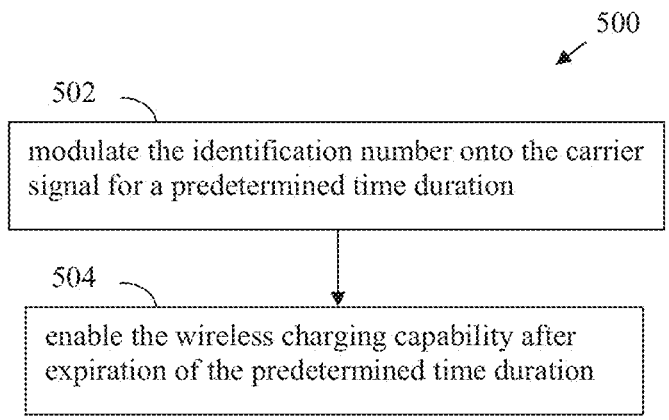
FIG. 5 shows a flowchart providing a process for enabling a portable computing device to emulate a proximity card for a predetermined time duration before enabling wireless charging capability, according to an example embodiment.

For instance, in one embodiment, portable computing device 400 may operate according to FIG. 5. FIG. 5 shows a flowchart 500 providing a process for enabling a portable computing device to emulate a proximity card for a predetermined time duration before enabling wireless charging capability, according to an example embodiment. Flowchart 500 is described as follows.

According to step 502 of flowchart 500, the identification number is modulated onto the carrier signal for a predetermined time duration. In an embodiment, when a carrier signal is received, sensor processor 416 and modulation circuit 406 may be configured to modulate the identification number onto the carrier signal for a predetermined time duration. Sensor processor 416 may optionally repeat transmitting of the identification number to modulation circuit 406 one or more times during the time duration to have the identification number transmitted in response signal 122 from antenna 424 multiple times. The predetermined time duration may have any length, such as a second, two seconds, further numbers of seconds, a portion of a second (e.g., a half second, 100 milliseconds, etc.), or any other time duration.

In step 504, the wireless charging capability is enabled after expiration of the predetermined time duration. After the predetermined time duration is expired, wireless charging of the rechargeable battery may be enabled. In such an embodiment, antenna 424 may receive wireless charging signal 444 (if being transmitted by a wireless charger), and wireless charging controller 404 may generate wireless charging current 442 to charge rechargeable battery 428.

In this manner, if the carrier signal is transmitted by a reader, the identification number is provided in response (in step 502), and corresponding functionality may be enabled. Upon enabling wireless charging (in step 504), no charging will occur because no wireless charging signal is present. In contrast, if the carrier signal is a wireless signal transmitted by a wireless charger, the identification number is still transmitted for a short duration (in step 502), and then wireless charging of the battery may begin (in step 504). The resulting delay in the beginning of wireless charging in this circumstance has little to no adverse effect on overall battery charging due to its short duration.

Figure 6:
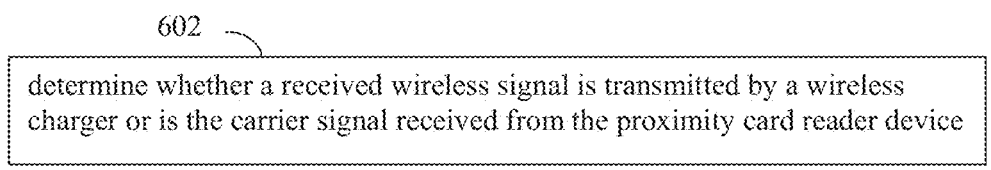
FIG. 6 shows a process for determining whether a carrier signal is a wireless charging signal or a proximity card interrogation signal, according to an example embodiment.

In another embodiment, portable computing device 400 may operate according to FIG. 6. FIG. 6 shows a step 602 for determining whether a carrier signal is a wireless charging signal or a proximity card interrogation signal, according to an example embodiment. Step 602 may be performed before either of proximity card emulation or wireless charging of a battery is attempted. According to step 602, whether a received wireless signal is transmitted by a wireless charger or is the carrier signal received from the proximity card reader device is determined. In such an embodiment, carrier detection module 430 and/or sensor processor 416 in FIG. 4 may be configured to determine whether interrogation signal 120 is a wireless signal transmitted by a wireless charger or a carrier signal transmitted by the proximity card reader device. Carrier detection module 430 may provide an indication of the carrier signal to sensor processor 416 when the wireless signal is determined to be transmitted by the proximity card reader device, to enable the identification number to be transmitted.

Carrier detection module 430 may be configured to determine whether the received signal is received from a wireless charger or from a proximity card reader device in any manner. For instance, in one embodiment, carrier detection module 430 may be configured to measure an amplitude of interrogation signal 120 (based on carrier signal 432). Carrier detection module 430 may determine the wireless signal to be transmitted by a wireless charger if the measured amplitude is greater than a predetermined threshold value.

The predetermined threshold value may be an intermediate voltage value between an expected charging signal amplitude from a wireless charger and an expected carrier signal amplitude from a reader device (e.g., the midpoint voltage or power, or other intermediate voltage or power). Typically, the amplitude of a charging signal from a wireless charger is greater than the amplitude of a carrier signal from a reader device. As such, carrier detection module 430 may determine the wireless signal to be transmitted by a proximity card reader device if the measured amplitude is less than the predetermined threshold value.

Alternatively, carrier detection module 430 and/or sensor processor 416 may analyze the received wireless signal to determine whether the wireless signal includes a wireless power transfer communication. Proximity card readers and proximity cards typically conduct a unidirectional communication of data from the card to the reader. In such a situation, a proximity card typically receives a simple, unmodulated carrier signal from a reader device. Therefore, if carrier detection module 430 detects that an unmodulated carrier signal is received, portable computing device 400 may assume that the received carrier signal is transmitted by a reader device, and may enter the proximity card emulation mode.

Some types of wireless chargers engage in bidirectional communications with wireless charging controllers of devices to be charged. In such cases, the wireless charger may transmit information to a device-to-be-charged prior to or in addition to the wireless charging signal. The information may be information regarding the wireless charging signal, may be a request for information regarding the device, and/or may be other information negotiated between the wireless charger and device. As such, if carrier detection module 430 and/or sensor processor 416 detect information modulated on the received carrier signal, portable computing device 400 may assume that the received carrier signal is transmitted by a wireless charger, and may enter the wireless charging mode. Alternatively, sensor processor 416 may attempt to communicate with the device (e.g., using modulation circuit 406 and antenna 424), and if the device responds, the device may be assumed to be a wireless charger.

Other ways of determining whether the device transmitting the wireless signal is a wireless charger or a proximity card reader device may be used in embodiments (e.g., portable computing device 400 may capture an image of the device and use image recognition techniques, etc.).

It is noted that because wireless charging and proximity card emulation use a same antenna in the embodiment of FIG. 4, access to the antenna may have to be configured to avoid both functions from accessing the antenna at the same time, and that the proper mode is operated in when desired (e.g., operating in a wireless charging mode or in an proximity card emulation mode).

Figure 7:
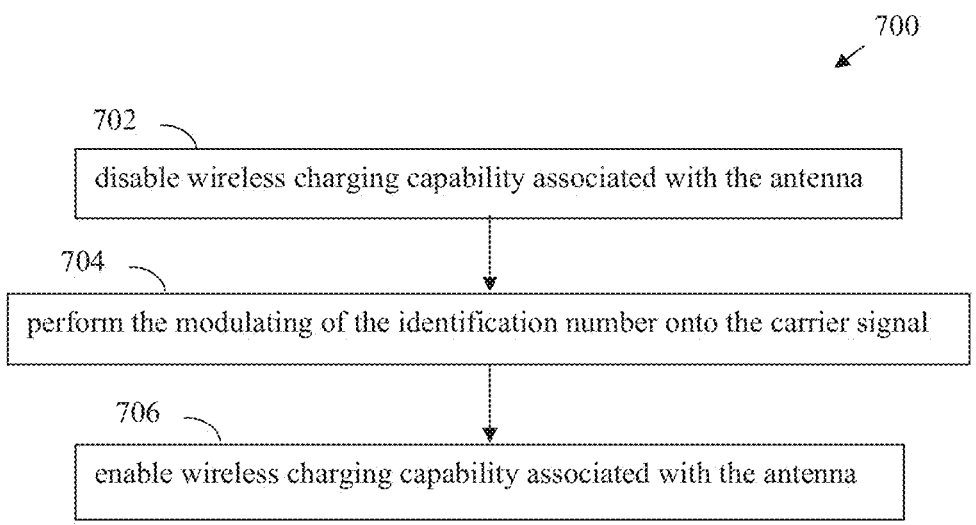
FIG. 7 shows a flowchart providing a process for disabling wireless charging capability in a portable computing device while emulating a proximity card, according to an example embodiment.
Figure 8:
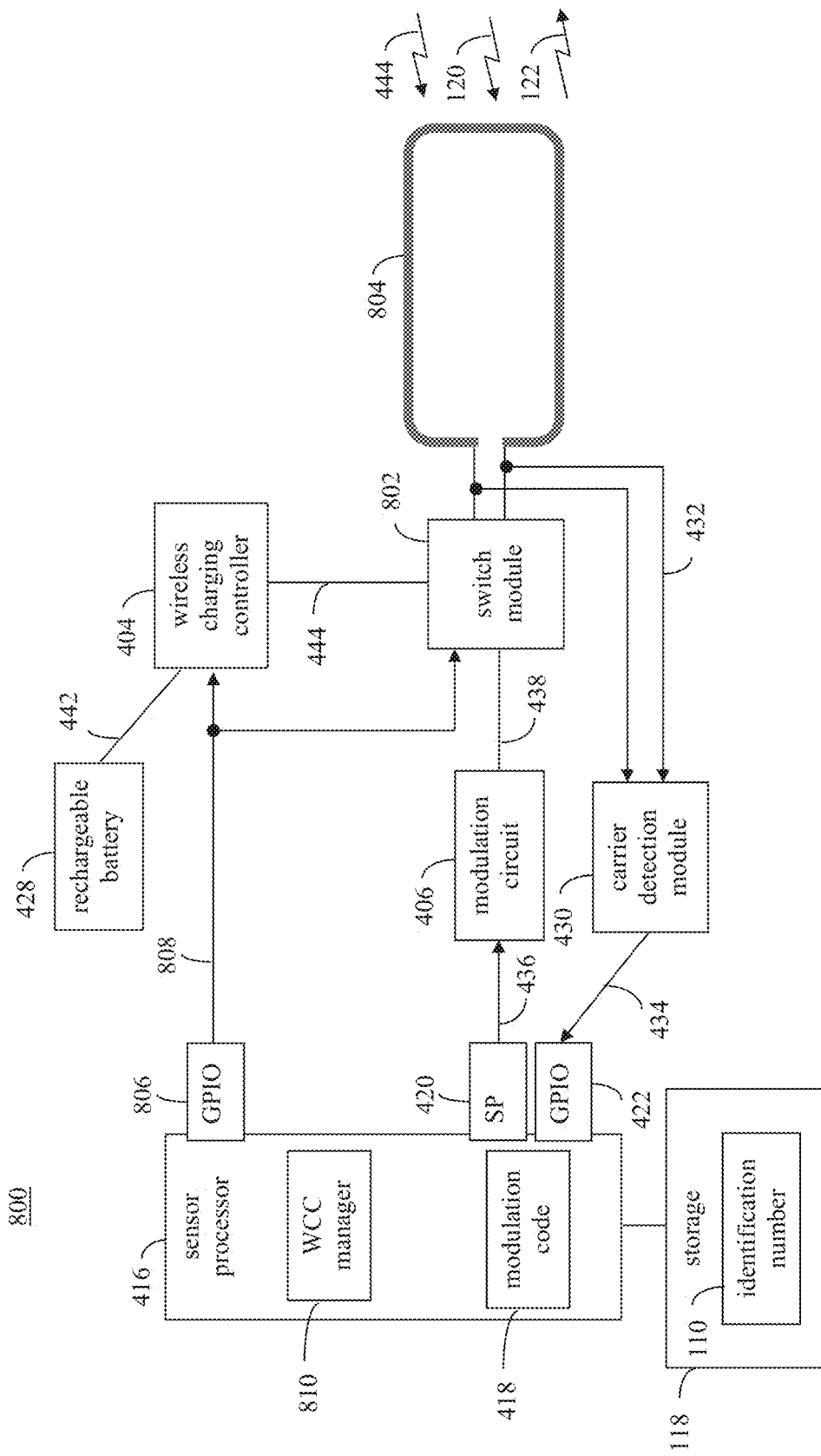
FIG. 8 shows a block diagram of a portable computing device that is configured to emulate a proximity card, according to an example embodiment.

For example, in an embodiment, portable computing device 400 may operate according to FIG. 7. FIG. 7 shows a flowchart 700 providing a process for disabling wireless charging capability in a portable computing device while emulating a proximity card, according to an example embodiment. Flowchart 700 is described as follows with regard to FIG. 8. FIG. 8 shows a block diagram of a portable computing device 800 that is configured to emulate a proximity card, according to an example embodiment. Portable computing device 800 is an example of portable computing device 400 of FIG. 4. As shown in FIG. 8, portable computing device 800 includes storage 118, main processor 402, wireless charging controller 404, modulation circuit 406, dedicated sensor processor 416, rechargeable battery 428, carrier detection module 430, a switch module 802, and a wireless charging antenna 804. Wireless charging antenna 804 is a loop or coil antenna that is an example of wireless charging antenna 424, and may include any number of one or more loops or coils. Flowchart 700 and portable computing device 800 are described as follows. Further structural and operational embodiments will be apparent to persons skilled in the relevant art(s) based on the following description.

For example, as described above with regard to flowchart 200 (FIG. 2), interrogation signal 120 may be received from a proximity card reader device at an antenna, such as antenna 804. Carrier detection module 430 may receive carrier signal 432 from antenna 804, and may generate detected carrier indication 434, which indicates a carrier frequency was detected. Sensor processor 416 may receive carrier indication 434.

Step 702 of flowchart 700 may be performed after step 202. In step 702, wireless charging capability associated with the antenna is disabled. In an embodiment, based on receipt of carrier indication 434, sensor processor 416 may disable wireless charging capability to avoid potential interference between wireless charging communications and sending proximity card data. For example, as shown in FIG. 4, sensor processor 416 may include a wireless charging controller (WCC) manager 810. WCC manager 810 is configured to disable wireless charging controller 404 during proximity card data communications, and to enable wireless charging controller 404 for wireless charging. For instance, in an embodiment, WCC manager 810 may generate a WCC control signal 808. WCC control signal 808 may be transmitted from a GPIO port 806 or other port of sensor processor 416. WCC control signal 808 is configured to enable or disable wireless charging controller 404. For instance, WCC manager 810 may generate WCC control signal 808 to have a first state (e.g., a logic "1" or "0") to cause wireless charging controller 404 to be disabled when a reader device carrier signal is detected.

In one embodiment, wireless charging controller 404 may have an enable input, pin, or port (depending on the configuration of wireless charging controller 404). As shown in FIG. 4, wireless charging controller 404 may receive WCC control signal 808 in the first state at the enable input. In response, wireless charging controller 404 may be disabled from performing wireless charging using antenna 804 (e.g., may decouple itself from antenna 804 using an internal switch or other mechanism).

Additionally or alternatively, switch module 802 may be present, and may receive WCC control signal 808. Switch module 802 may include one or more switches that may be actuated (e.g., opened) to decouple wireless charging controller 404 from antenna 804 (e.g., by opening one or more conductors between wireless charging controller 404 and antenna 804 that conduct wireless charging signal 444). For instance, as shown in FIG. 8, antenna 804 may have first and second ends (the two ends of the loop/coil). Switch module 802 may include a pair of switches that each separately decouple a corresponding end of antenna 804 from a respective conductor, or may include another number of switches to perform the decoupling.

Accordingly, in one or both of these ways, and/or in further ways, when a carrier signal is received from a reader device, wireless charging capability may be disabled in portable computing device 800.

In step 704, the modulating of the identification number onto the carrier signal is performed. In an embodiment, after wireless charging capability associated with antenna 804 is disabled, sensor processor 416 and modulation circuit 406 may modulate identification number 110 on the received carrier signal in response signal 122. Switch module 802, when present, may include one or more switches that may be actuated (e.g., closed) to couple modulation circuit 406 to antenna 804 to enable the identification number to be modulated onto the carrier signal at antenna 804 (e.g., by closing one or more conductors between modulation circuit 406 and antenna 804). In this manner, proximity card emulation is enabled in portable computing device 800, and the identification number may be transmitted to the reader device (and optionally re-transmitted one or more times to ensure reception).

In step 706, wireless charging capability associated with the antenna is enabled. After the card data has been transmitted, the wireless charging capability may be re-enabled, and wireless charging controller 404 may attempt to establish communications with a remote battery charger. This enabling may be performed in any manner. For instance, in an embodiment, after a predetermined time duration and/or other trigger, WCC manager 810 may generate WCC control signal 808 to have a second state (e.g., a logic "0" or "1") to cause wireless charging controller 404 to be enabled.

In one embodiment, wireless charging controller 404 may receive WCC control signal 808 in the second state at the enable input. In response, wireless charging controller 404 may be enabled to perform wireless charging using antenna 804 (e.g., may couple itself to antenna 804 using an internal switch or other mechanism).

Additionally and/or alternatively switch module 802 may be present, and may receive WCC control signal 808 in the second state. The switch(es) of switch module 802 may be actuated (e.g., closed) to couple wireless charging controller 404 to antenna 804 (e.g., by closing one or more conductors between wireless charging controller 404 and antenna 804 that conduct wireless charging signal 444).

Furthermore, one or more switches of switch module 802 may be actuated (e.g., opened) to decouple modulation circuit 406 from antenna 804 (e.g., by opening one or more conductors between modulation circuit 406 and antenna 804). In this manner, proximity card emulation is disabled in portable computing device 800, and wireless charging may be performed if wireless charging signal 444 is received.

It is noted that during wireless charging, the transmission of proximity card data (e.g., identification number 110 of FIG. 1) may be halted until the wireless charging carrier signal is no longer present for a minimum time threshold (and/or when wireless charging controller 404 indicates to sensor processor 416 that the wireless charger is no longer in range), indicating the user has likely intended to stop wireless charging.

Switch module 802 may be configured in any manner to perform its functions. For instance, switch module 802 may include any number of switches in any form, including in the form of relays, transistors (such as MOSFETs or other types of semiconductor transistors), or other type of switches. The switches may be single pole, single throw (SPST), single pole, double throw (SPDT), double pole, single throw (DPST), or other type of switch configuration.

Example Portable Computing Device Embodiments

Portable computing device 102, reader device 104, compare logic 116, processor 126, portable computing device 400, main processor 402, wireless charging controller 404, modulation circuit 406, application 410, platform code 412, driver 414, dedicated sensor processor 416, modulation code 418, carrier detection module 430, portable computing device 800, switch module 802, WCC manager 810, flowchart 200, flowchart 300, flowchart 500, step 602, and/or flowchart 700 may be implemented in hardware, or hardware combined with software and/or firmware. For example, compare logic 116, processor 126, main processor 402, application 410, platform code 412, driver 414, dedicated sensor processor 416, modulation code 418, carrier detection module 430, WCC manager 810, flowchart 200, flowchart 300, flowchart 500, step 602, and/or flowchart 700 may be implemented as computer program code/instructions configured to be executed in one or more processors and stored in a computer readable storage medium. Alternatively, portable computing device 102, reader device 104, compare logic 116, processor 126, portable computing device 400, main processor 402, wireless charging controller 404, modulation circuit 406, application 410, platform code 412, driver 414, dedicated sensor processor 416, modulation code 418, carrier detection module 430, portable computing device 800, switch module 802, WCC manager 810, flowchart 200, flowchart 300, flowchart 500, step 602, and/or flowchart 700 may be implemented as hardware logic/electrical circuitry.

For instance, in an embodiment, one or more of compare logic 116, processor 126, main processor 402, wireless charging controller 404, modulation circuit 406, application 410, platform code 412, driver 414, dedicated sensor processor 416, modulation code 418, carrier detection module 430, switch module 802, WCC manager 810, flowchart 200, flowchart 300, flowchart 500, step 602, and/or flowchart 700 may be implemented together in a system-on-chip (SoC). The SoC may include an integrated circuit chip that includes one or more of a processor (e.g., a central processing unit (CPU), microcontroller, microprocessor, digital signal processor (DSP), etc.), memory, one or more communication interfaces, and/or further circuits and/or embedded firmware to perform its functions.

Figure 9:
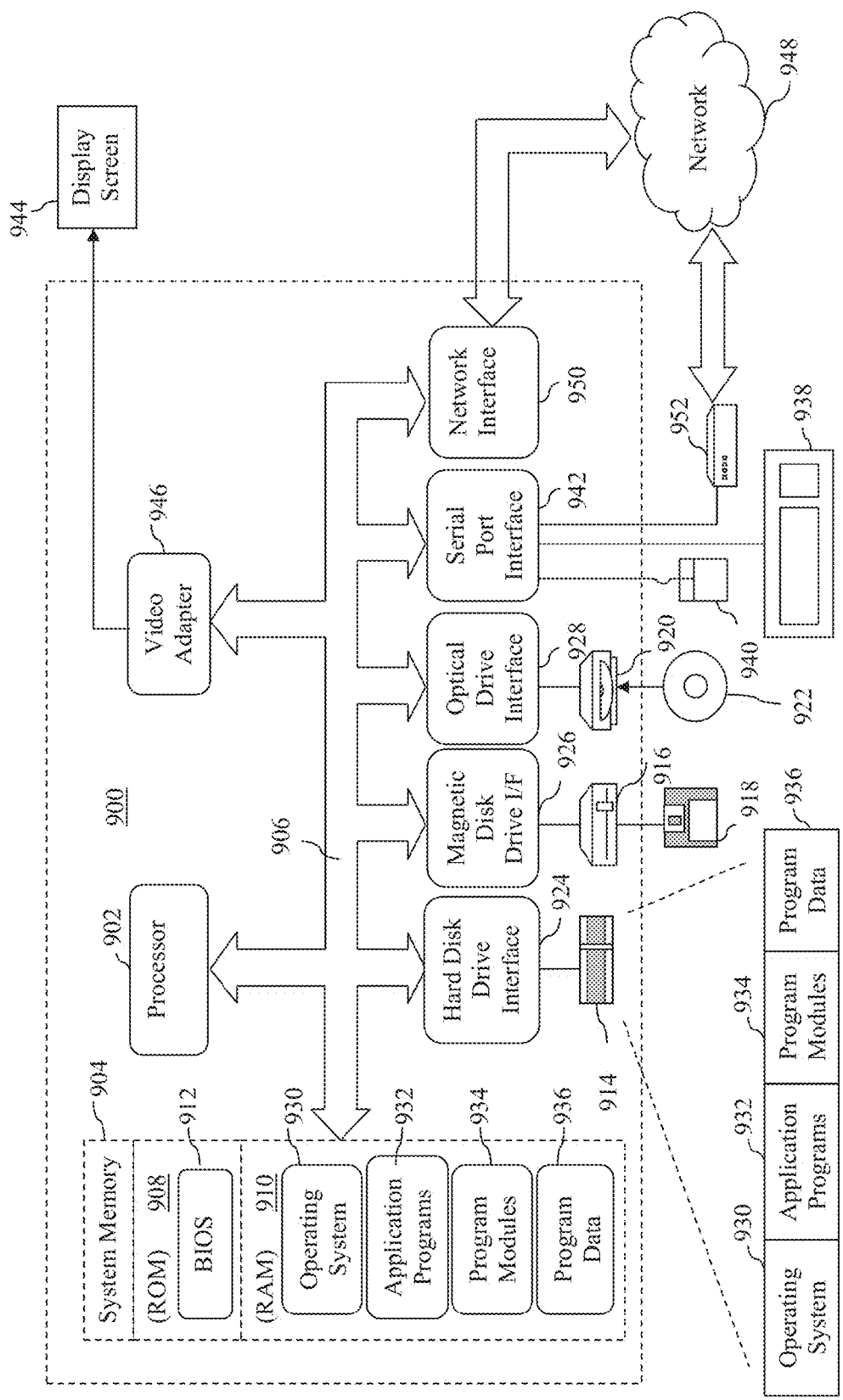
FIG. 9 shows a block diagram of an example computing device that may be used to implement embodiments of the present invention.

FIG. 9 depicts an exemplary implementation of a computing device 900 in which embodiments of the present invention may be implemented. For example, portable computing device 102, reader device 104, portable computing device 400, and/or portable computing device 800 may be implemented in one or more computing devices similar to computing device 900, including one or more features of computing device 900 and/or alternative features. The description of computing device 900 provided herein is provided for purposes of illustration, and is not intended to be limiting. Embodiments of the present invention may be implemented in further types of computer systems, as would be known to persons skilled in the relevant art(s).

As shown in FIG. 9, computing device 900 includes one or more processors 902, a system memory 904, and a bus 906 that couples various system components including system memory 904 to processor 902. Bus 906 represents one or more of any of several types of bus structures, including a memory bus or memory controller, a peripheral bus, an accelerated graphics port, and a processor or local bus using any of a variety of bus architectures. System memory 904 includes read only memory (ROM) 908 and random access memory (RAM) 910. A basic input/output system 912 (BIOS) is stored in ROM 908.

Computing device 900 may include one or more of the following drives: a hard disk drive 914 for reading from and writing to a hard disk, a magnetic disk drive 916 for reading from or writing to a removable magnetic disk 918, and an optical disk drive 920 for reading from or writing to a removable optical disk 922 such as a CD ROM, DVD ROM, or other optical media. Hard disk drive 914, magnetic disk drive 916, and optical disk drive 920 are connected to bus 906 by a hard disk drive interface 924, a magnetic disk drive interface 926, and an optical drive interface 928, respectively. The drives and their associated computer-readable media provide nonvolatile storage of computer-readable instructions, data structures, program modules and other data for the computer. Although a hard disk, a removable magnetic disk and a removable optical disk are described, other types of computer-readable storage media can be used to store data, such as flash memory cards, digital video disks, RAMs, ROMs, and the like.

A number of program modules may be stored on the hard disk, magnetic disk, optical disk, ROM, or RAM. These programs include an operating system 930, one or more application programs 932, other program modules 934, and program data 936. Application programs 932 or program modules 934 may include, for example, computer program logic (e.g., computer program code or instructions) for implementing compare logic 116, processor 126, main processor 402, application 410, platform code 412, driver 414, dedicated sensor processor 416, modulation code 418, carrier detection module 430, WCC manager 810, flowchart 200, flowchart 300, flowchart 500, step 602, and/or flowchart 700 (including any step of flowcharts 200, 300, 500, and 700), and/or further embodiments described herein.

A user may enter commands and information into the computing device 900 through input devices such as keyboard 938 (which may be physical or virtual) and pointing device 940, when present. Other input devices (not shown) may include a microphone, joystick, game pad, scanner, a touch screen and/or touch pad, a voice recognition system to receive voice input, a gesture recognition system to receive gesture input, or the like. These and other input devices are often connected to processor 902 through a serial port interface 942 that is coupled to bus 906, but may be connected by other interfaces, such as a parallel port, game port, or a universal serial bus (USB).

A display screen 944 is also connected to bus 906 via an interface, such as a video adapter 946. Display screen 944 may be external to, or incorporated in computing device 900. Display screen 944 may display information, as well as being a user interface for receiving user commands and/or other information (e.g., by touch, finger gestures, virtual keyboard, etc.). In addition to display screen 944, computing device 900 may include other internal or peripheral output devices (not shown) such as speakers and printers.

Computing device 900 is connected to a network 948 (e.g., the Internet) through an adaptor or network interface 950, a modem 952, or other means for establishing communications over the network. Modem 952, which may be internal or external, may be connected to bus 906 via serial port interface 942, as shown in FIG. 9, or may be connected to bus 906 using another interface type, including a parallel interface.

As used herein, the terms "computer program medium," "computer-readable medium," and "computer-readable storage medium" are used to generally refer to media such as the hard disk associated with hard disk drive 914, removable magnetic disk 918, removable optical disk 922, as well as other media such as flash memory cards, digital video disks, RAMs, ROMs, and further types of physical storage media. Such computer-readable storage media are distinguished from and non-overlapping with communication media (do not include communication media). Communication media typically embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media, as well as signals transmitted over wires. Embodiments are also directed to such communication media.

As noted above, computer programs and modules (including application programs 932 and other program modules 934) may be stored on the hard disk, magnetic disk, optical disk, ROM, or RAM. Such computer programs may also be received via network interface 950, serial port interface 942, or any other interface type. Such computer programs, when executed or loaded by an application, enable computing device 900 to implement features of embodiments of the present invention discussed herein. Accordingly, such computer programs represent controllers of the computing device 900.

The invention is also directed to computer program products comprising software stored on any computer useable medium. Such software, when executed in one or more data processing devices, causes a data processing device(s) to operate as described herein. Embodiments of the present invention employ any computer-useable or computer-readable medium, known now or in the future. Examples of computer-readable mediums include, but are not limited to storage devices such as RAM, hard drives, floppy disks, CD ROMs, DVD ROMs, zip disks, tapes, magnetic storage devices, optical storage devices, MEMs, nanotechnology-based storage devices, and the like.

VI. Conclusion

While various embodiments of the present invention have been described above, it should be understood that they have been presented by way of example only, and not limitation. It will be understood by those skilled in the relevant art(s) that various changes in form and details may be made therein without departing from the spirit and scope of the invention as defined in the appended claims. Accordingly, the breadth and scope of the present invention should not be limited by any of the above-described exemplary embodiments, but should be defined only in accordance with the following claims and their equivalents.

What is claimed is:

1. A portable computing device, comprising:
an antenna;
storage that stores an identification number;
a processor configured to control modulation of the identification number onto a carrier signal received by the antenna from a proximity card reader device to enable the portable computing device to emulate a proximity card; and
a carrier detection module configured to:
determine that a received signal is a wireless signal transmitted by a wireless charger in response to a determination that the received signal has a measured amplitude greater than a predetermined threshold value; and
determine that the received signal is the carrier signal in response to a determination that the received signal has a measured amplitude that is less than the predetermined threshold value.

2. The portable computing device of claim 1, wherein the portable computing device is a smartphone.

3. The portable computing device of claim 1, wherein the portable computing device is configured to emulate a proximity card by responding to a proximity card reader device in a first mode, and to receive a wireless charging signal from a battery charger to charge a rechargeable battery in a second mode.

4. The portable computing device of claim 1, wherein the carrier detection module provides an indication of the carrier signal to the processor when the wireless signal is determined to be transmitted by the proximity card reader device.

5. The portable computing device of claim 4, wherein the carrier detection module is configured to determine that the received signal is the wireless signal if the received signal includes a wireless power transfer communication.

6. The portable computing device of claim 4, wherein the processor receives the carrier signal indication on a general purpose input-output port.

7. The portable computing device of claim 1, further comprising:
a modulation circuit coupled between the processor and the antenna;
the processor configured to retrieve the identification number from the storage and to provide the identification number to the modulation circuit according to a predetermined timing; and
the modulation circuit configured to modulate the identification number onto the carrier signal at the antenna according to the predetermined timing.

8. The portable computing device of claim 7, wherein the predetermined timing is configured to synchronize bits of the identification number with a frequency of the carrier signal.

9. The portable computing device of claim 7, wherein the processor transmits the identification number to the modulation circuit from a serial port.

10. The portable computing device of claim 1, further comprising:
a wireless charging controller coupled to the antenna to enable a rechargeable battery of the portable computing device to be wirelessly charged by a wireless charging signal received by the antenna;
the processor configured to disable wireless charging of the rechargeable battery when the identification number is being modulated onto the carrier signal; and
the processor configured to enable wireless charging of the rechargeable battery when the identification number is not being modulated onto the carrier signal.

11. The portable computing device of claim 10, wherein the processor enables the identification number to be modulated onto the carrier signal for a predetermined time duration, and enables the wireless charging of the rechargeable battery after expiration of the predetermined time duration.

12. A method in a portable computing device, comprising:
determining whether a received wireless signal is transmitted by a wireless charger or is a carrier signal received from a proximity card reader device by:
measuring an amplitude of the wireless signal,
determining the wireless signal to be the carrier signal received from the proximity card reader device and causing the portable computing device to enter a first mode if the measured amplitude is less than the predetermined threshold value, and
determining the wireless signal to be transmitted by the wireless charger and causing the portable computing device to enter a second mode if the measured amplitude is greater than a predetermined threshold value;
in the first mode,
receiving the carrier signal transmitted by the proximity card reader device at an antenna of the portable computing device,
accessing an identification number stored in storage of the portable computing device, and
modulating the identification number onto the carrier signal to enable the portable computing device to emulate a proximity card; and
in the second mode, receiving a wireless charging signal at the antenna from a battery charger to charge a rechargeable battery.

13. The method of claim 12, further comprising:
disabling wireless charging capability associated with the antenna;
performing said modulating of the identification number onto the carrier signal; and
enabling wireless charging capability associated with the antenna.

14. The method of claim 13, wherein said modulating the identification number onto a carrier signal comprises:
modulating the identification number onto the carrier signal for a predetermined time duration; and
wherein said enabling wireless charging capability associated with the antenna comprises:
enabling the wireless charging capability after expiration of the predetermined time duration.

15. The method of claim 13, further comprising:
determining whether a received wireless signal is transmitted by a wireless charger or is the carrier signal received from the proximity card reader device; and
when the wireless signal is determined to be the carrier signal received from the proximity card reader device,
performing said disabling of wireless charging capability associated with the antenna, and
performing said modulating of the identification number onto the carrier signal.

16. The method of claim 12, wherein said determining whether a received wireless signal is transmitted by a wireless charger or is the carrier signal received from the proximity card reader device comprises:
determining whether the wireless signal includes a wireless power transfer communication.

17. A computer readable storage medium having computer program instructions stored in the computer readable storage medium that enable a processor to perform a method in a portable computing device, the method comprising:
determining whether a received wireless signal is transmitted by a wireless charger or is a carrier signal received from a proximity card reader device by:
measuring an amplitude of the wireless signal,
determining the wireless signal to be the carrier signal received from the proximity card reader device and causing the portable computing device enter a first mode if the measured amplitude is less than the predetermined threshold value, and
determining the wireless signal to be transmitted by the wireless charger and causing the portable computing device to enter a second mode if the measured amplitude is greater than a predetermined threshold value;
in the first mode,
accessing an identification number stored in storage of the portable computing device,
receiving an indication of the carrier signal received at the antenna from the proximity card reader device, and providing the identification number to a modulation circuit according to predetermined timing to modulate the identification number onto the carrier signal by the antenna to enable the portable computing device to emulate a proximity card; and in the second mode, receiving a wireless charging signal at the antenna from a battery charger to charge a rechargeable battery of the portable computing device.

18. The computer readable storage medium of claim 17, wherein said providing comprises:

repeating providing the identification number to the modulation circuit according to the predetermined timing for a predetermined time duration.

19. The computer readable storage medium of claim 17, wherein said determining whether a received wireless signal is transmitted by a wireless charger or is the carrier signal received from the proximity card reader device comprises:

determining whether the wireless signal includes a wireless power transfer communication.

20. The computer readable storage medium of claim 17, wherein the predetermined timing is configured to synchronize bits of the identification number with a frequency of the carrier signal.

* * * * *